(12) United States Patent
Iannone

(10) Patent No.: US 8,706,447 B2
(45) Date of Patent: Apr. 22, 2014

(54) PROCEDURE FOR THE PROGNOSTIC OF A STRUCTURE SUBJECT TO LOADS

(75) Inventor: Michele Iannone, Torre Annunziata (IT)

(73) Assignee: Alenia Aeronautica S.p.A., Pomigliano d'Arco, Naples (IT)

( * ) Notice: Subject to any disclaimer, the term of this patent is extended or adjusted under 35 U.S.C. 154(b) by 283 days.

(21) Appl. No.: 12/996,582

(22) PCT Filed: Dec. 4, 2009

(86) PCT No.: PCT/IB2009/055515
§ 371 (c)(1),
(2), (4) Date: Dec. 6, 2010

(87) PCT Pub. No.: WO2010/064216
PCT Pub. Date: Jun. 10, 2010

(65) Prior Publication Data
US 2011/0087442 A1      Apr. 14, 2011

(30) Foreign Application Priority Data

Dec. 5, 2008  (IT) .............................. TO2008A0908

(51) Int. Cl.
*G21C 17/013* (2006.01)

(52) U.S. Cl.
USPC ......................................................... 702/183

(58) Field of Classification Search
USPC .................. 702/34–36, 41, 42, 183–185, 188
See application file for complete search history.

(56) References Cited

U.S. PATENT DOCUMENTS

| | | | |
|---|---|---|---|
| 5,195,046 A | 3/1993 | Gerardi et al. | 702/35 |
| 6,125,333 A * | 9/2000 | Pun | 702/42 |
| 2003/0158676 A1 * | 8/2003 | Fields et al. | 702/42 |
| 2004/0225474 A1 | 11/2004 | Goldfine et al. | 702/183 |
| 2006/0243056 A1 * | 11/2006 | Sundermeyer et al. | 73/760 |
| 2006/0259217 A1 * | 11/2006 | Gorinevsky et al. | 701/29 |
| 2008/0177516 A1 * | 7/2008 | Vasudevan et al. | 703/2 |

FOREIGN PATENT DOCUMENTS

WO    WO 02/086726 A    10/2002

* cited by examiner

*Primary Examiner* — Mohamed Charioui
(74) *Attorney, Agent, or Firm* — Merchant & Gould P.C.

(57) ABSTRACT

A method for prognostics of a structure subject to loads, particularly an aircraft structure, includes, detecting the state (strains) of the structure at multiple primary points and additional points. The loads acting on the structure associated with the state detected in the primary points are determined. Based on the determined loads, the state of the structure in the additional points is estimated. The estimated state of the structure is compared with the state detected in the additional points. A soundness state of the structure is assessed if the estimated and detected values of the state quantity are in agreement, or a defectiveness state of the structure if such values differ.

14 Claims, 5 Drawing Sheets

PROCEDURE FOR THE PROGNOSTIC OF A STRUCTURE SUBJECT TO LOADS

This application is a National Stage Application of PCT/IB2009/055515, filed 4 Dec. 2009, which claims benefit of Ser. No. TO2008A000908, filed 5 Dec. 2008 in Italy and which applications are incorporated herein by reference. To the extent appropriate, a claim of priority is made to each of the above disclosed applications.

BACKGROUND OF THE INVENTION

This invention is generally referred to a methodology of structural prognostic, and more specifically to a method and a system for the prognostic of a mechanical structure, in particular a structure of aircraft, adapted to evaluate the presence or to monitor the rise-up of damages or defects induced in a structure by operative loads and/or service events.

In the maintenance methodologies of systems (parts of products or complex products) it is extremely interesting the possibility of reducing unexpected failures, through the monitoring of some indicators of the system status.

According with the known technique, in aeronautics the rise-up of damages or defects in a mechanical structure of an aircraft, such as metallic or composite structure, e.g. the fuselage or the wing structure, are prognosticated through a historical recording of the events among which events that caused damages due to accidental impacts during production (impact of a tool) or service (impact with hail or rubble) and the loads born by the structure, or by an estimate of the fatigue underwent by the structure, starting from the knowledge of its characteristics of mechanical strength under typical loads in service conditions.

In particular, for composite structures, accidental impacts produce effects scarcely visible from outside, but they may cause relevant damages within the structure (e.g. delamination).

This technique is however expensive and not very accurate, because it does not indicate in real time the changes and the physical and mechanical conditions of the monitored structure.

SUMMARY OF THE INVENTION

This invention is aimed to provide an improved method for structural prognostic, which allows estimating continuously in a reliable way the physical and mechanical conditions of a structure.

A further object of the invention is to provide a method of prognostic applicable without heavy calculation loads, and thus which may be carried out on board on aircraft also in service conditions, e.g. during mission.

According to the present invention these objects are reached through a method for the prognostic of a mechanical structure.

Particular embodiments are the subject of the dependent claims, whose content has to be considered as an integral or integrating part of the present description.

Further subjects of the invention are a system and a computer program for the prognostic of a mechanical structure.

In summary, the present invention is based on the characterization of a mechanical structure under test subject to operating loads capable to produce local strains thereon, and on the correlation in real time of actual strain data and theoretical strain data, whose comparison allows evaluating the status of soundness or defectiveness of the structure.

The structure under test is equipped with a limited number of strain sensors located in relevant points and a mathematical model simulating the structure is given, the model being analytical or numerical depending on the morphological complexity of the structure (typically a bi-dimensional or three-dimensional finite element model).

An estimated deformation of the structure under test as a function of a given operative load is obtained through the model of the structure, interpolating or extrapolating to the whole structure starting from a limited number of actual values of strain (or other parameter indicating the state), measured by the provided sensors.

The calculation of the estimated strain data starting from the measured strain data is performed in practice by arguing from the latter the momentary load acting on the structure, and thus fixing the overall deformation of the structure in each other point of the model not coincident with the relevant points of measurement on the basis of the estimated load.

BRIEF DESCRIPTION OF THE DRAWINGS

Further characteristics and advantages of the invention will be more in detail described in the following detailed description of one of its embodiments, given as a not limiting example, with reference to the attached drawings, in which.

DETAILED DESCRIPTION OF THE PREFERRED EMBODIMENTS

Figure 1:
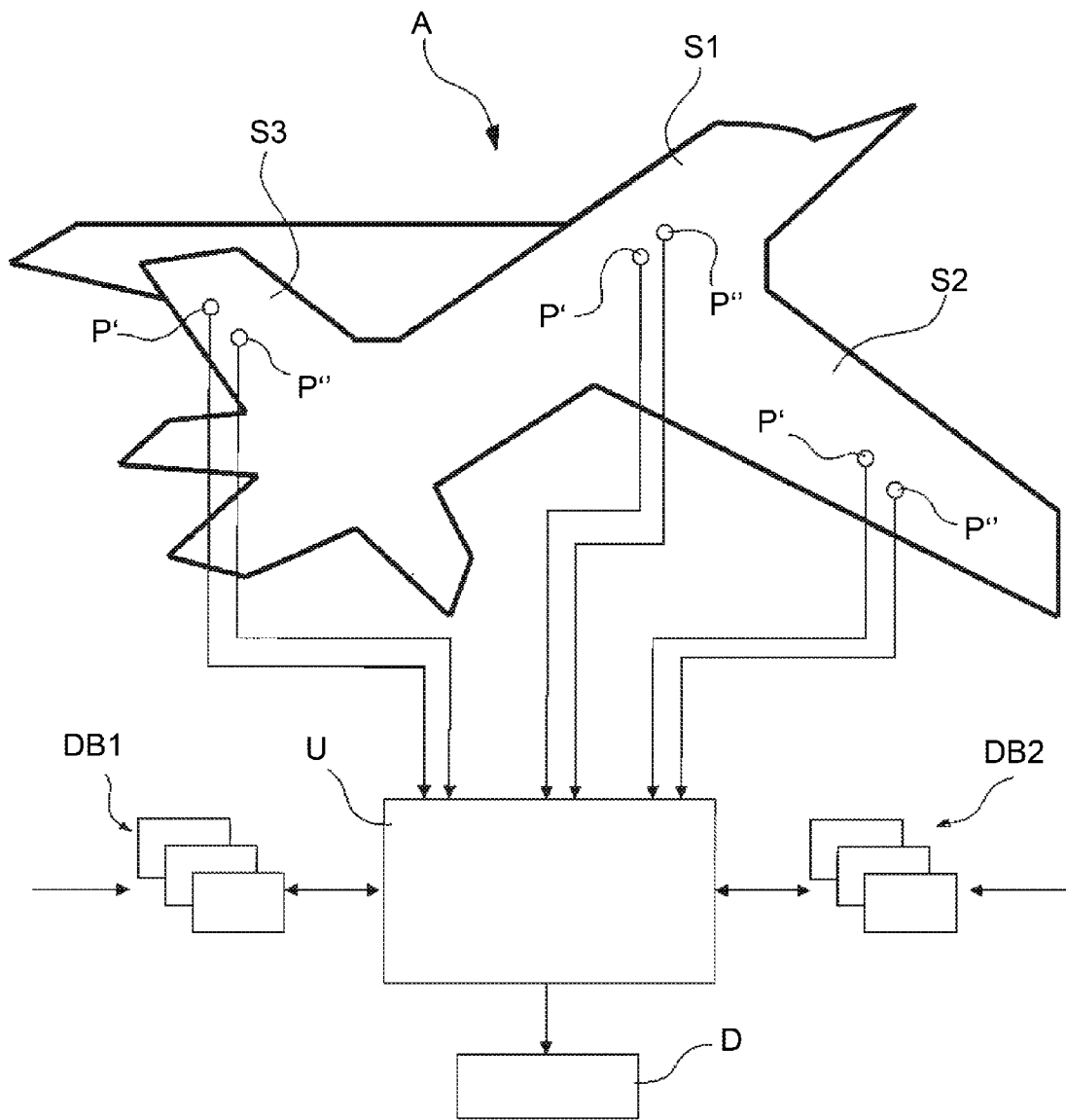
FIG. 1 shows an example of prognostic system applied to an aircraft.

An example of structural prognostic system in the preferred application to an aircraft is schematically drafted in FIG. 1.

In the aircraft, generally indicated with A, some structural parts are pointed out of which it is intended to monitor the soundness or defecting conditions, e.g. the fuselage S1, the wing structure S2 and the empennage S3. On each part two sensor sets are placed, respectively a plurality of primary sensors P' and a plurality of additional sensors P'', for simplicity indicated as a single pair of elements, adapted to detect a quantity representative of the state of the aircraft structures, e.g. the local static strain (possibly in more than one direction).

The sensors P', P'' are connected with an electronic processing unit U, to which they send the respective signals representative of the detected quantities. Databases DB1, DB2 are associated with the processing unit, which have stored therein associative relations among the values which may be assumed by predetermined physical quantities important for the structures, the loads acting on such structures and the morphology of these structures.

Furthermore, the processing unit is connected to a signalling unit D, adapted to inform an operator, like the aircraft pilot or a maintenance operator, visually through writing and graphs on a screen or electronically through issuing a report, on the status of soundness or defectiveness of the monitored structures.

Figure 2:
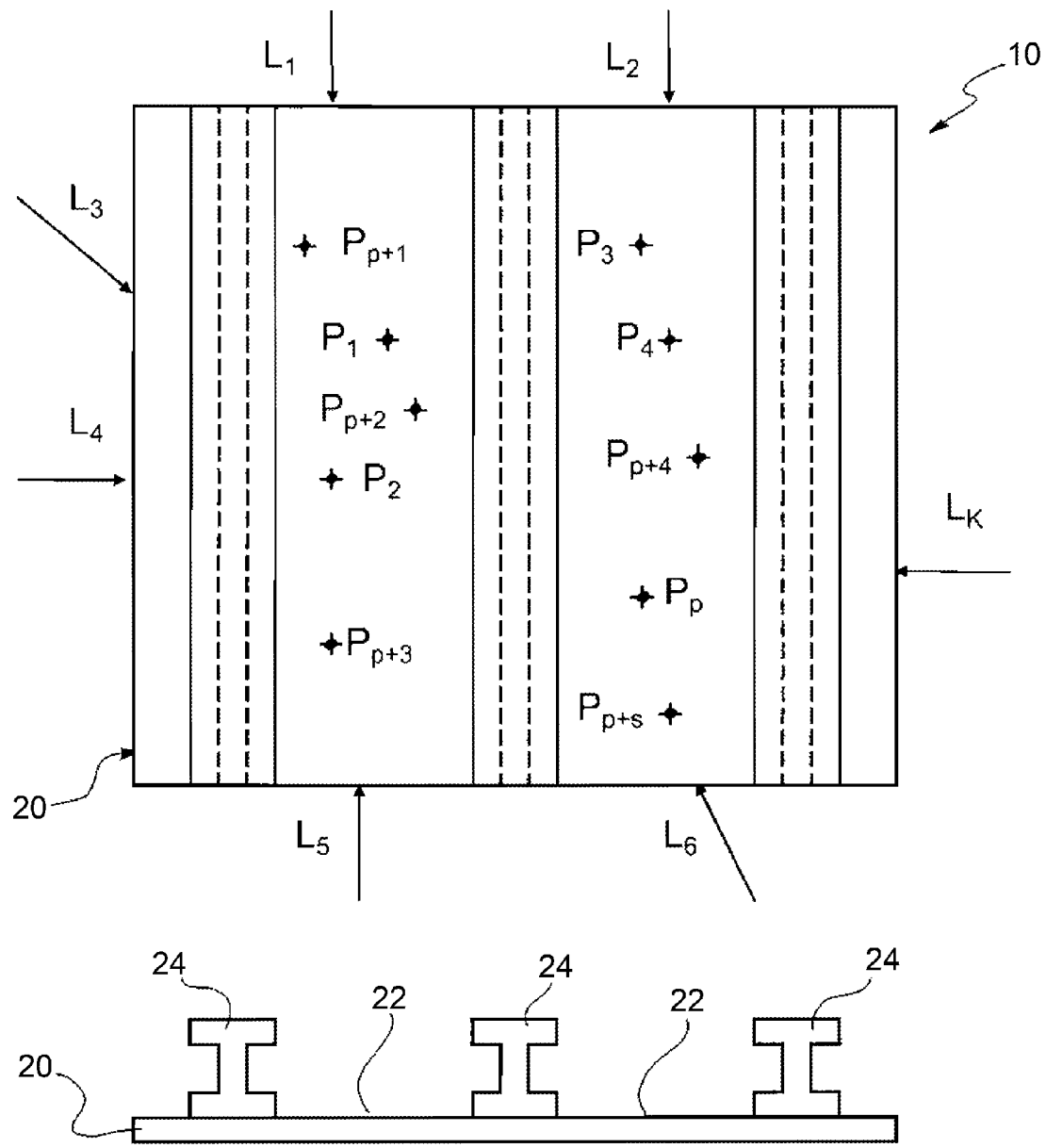
FIG. 2 shows an example of a structure and a force system acting on it.

An example of a structure subject to a prognostic system is shown in FIG. 2, having the shape of an aircraft fuselage panel, indicated in the whole with 10 and shown in a top and side plan view, including a flat basic element 20 having on a surface 22 a set of stiffening stringers 24.

The vectors representing the forces acting on the structure (mainly bi-dimensional) in a predetermined operating condition are indicated as $L_1$-$L_K$; as an example and for the sake of simplicity they have components only in the structure plane.

Relevant points on the structure surface are indicated with P, namely two sets of points, respectively a first set of primary detection points, indicated as $P_1$-$P_p$, and a second set of additional detection points, in the following identified as comparison detection points, indicated as $P_{p+1}$-$P_{p+s}$.

Preferably, the primary detection points are selected in such way that for each structure status a single load condition may be associated; whereas the additional detection points are selected with a criterion of substantial periodicity, with some possible intensification in the areas with highest structural criticality (e.g., the zone of skin-reinforcement bonding to prognosticate a possible de-bonding of the reinforcements).

In the detection points (or relevant points of the structure) strain sensors are placed, of a known type, e.g. surface or internal embedded sensors (electrically, optically or wirelessly) connected with the processing unit of the prognostic system on board the aircraft, which is adapted to associate the signals acquired from the sensors with structure strain values.

Known sensors could be, e.g., of the "strain gage" type, with a signal of electrical resistance variable with the strain, or of the "Bragg grating" type with the strain measurement based on reading the wavelength interfering with the grating, directly correlated with the strain.

Close to the detection points, distributed throughout the structure, are also advantageously provided temperature sensors (not represented), adapted to transfer the detected temperature data to the processing unit, whose object will be clear in the course of description.

Figure 3:
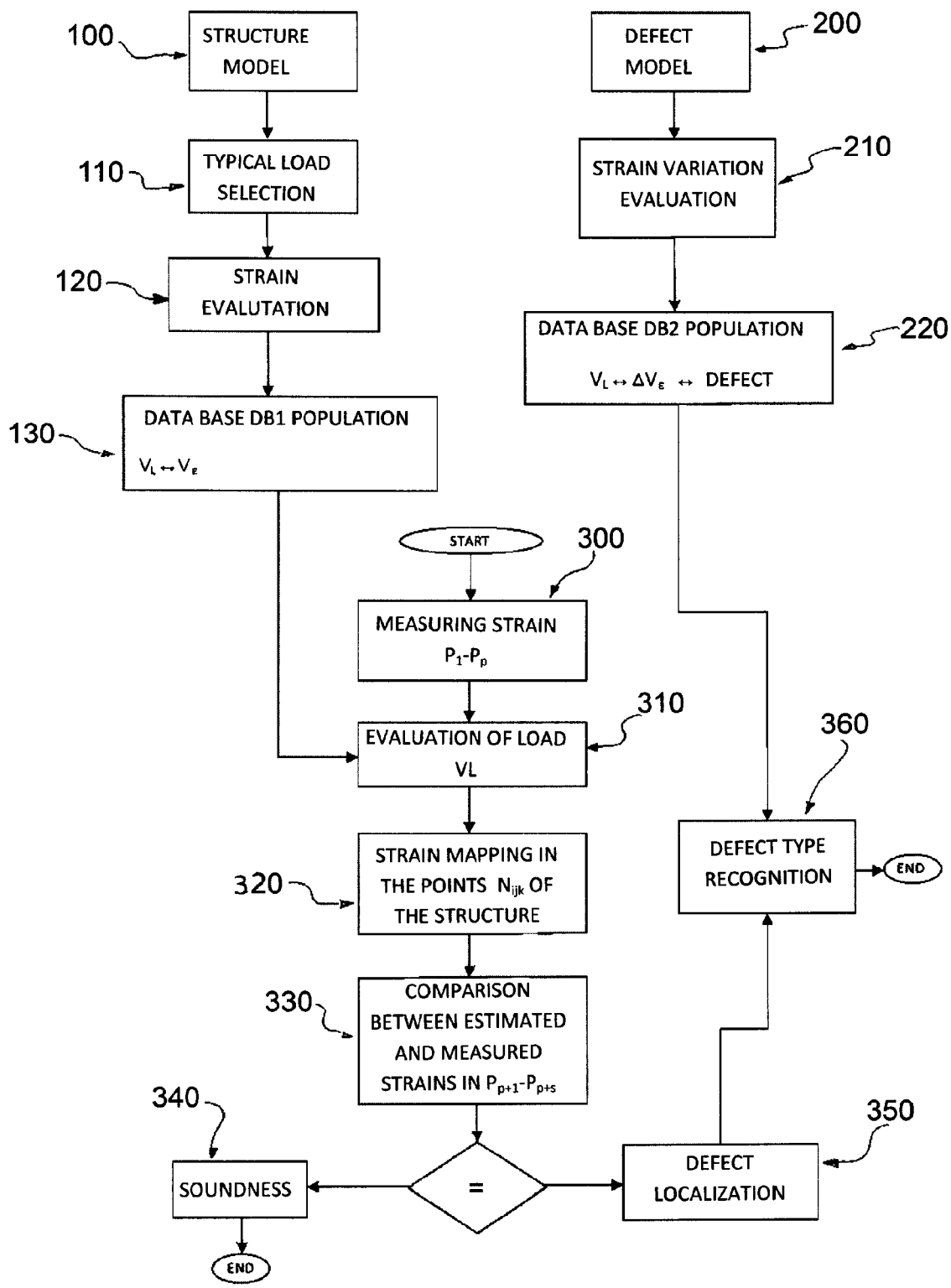
FIG. 3 is a flow diagram of the prognostic method which is the subject of the invention.

The prognostic method according to the invention is detailed with reference to the flow diagram in FIG. 3.

Preliminarily, e.g. through an off line processing system not integrated with the on board prognostic processing unit, once and for all, a model (100) of the subject structure is built, like a finite element model, so that on the structure a network of points $N_{ijk}$ is defined. The model utilizes as data also the elastic modules of the materials used on the structure, taking in account also their possible variability with the temperature.

An array $V_L$ of loads typical of the structure, having size K, is reported as:

$$V_L = (V_{L1}, V_{L2}, \ldots, V_{LK})$$

where $V_{L1}, \ldots, V_{LK}$ indicate respectively, with a short notation, the values of the three components of each vector of load or force acting on the structure in a selected spatial cartesian reference system.

Vector $V_L$ can theoretically take infinite values, because the forces that can act on the structure in the different possible operative condition are infinite, respectively on an infinite plurality of points of the panel, in an infinite plurality of possible directions and with an infinite plurality of intensity values.

For the invention purposes it is assumed that each element of $V_L$ can take a discrete finite number d of values, whereby the number of possible combinations (indicated as m) is reduced to $K^d$, but can be further reduced if only some possible combinations are considered (110) (e.g., varying only the value of one vector at a time).

Each possible value of the vector $V_L$ is indicated as $V_{Lm}$.

Considering the above finite element model, to each value $V_{Lm}$ of the vector $V_L$ will correspond a distribution of strain $E_{ijk}$ in the points $N_{ijk}$ of the structure.

It is also assumed that an experimental check is performed of the rightness of the presumed model, selecting a vector of relevant points on the structure, with size p, preferably among the points which—according to the (theoretical or numerical) model of the structure are capable of showing a more severe strain variation as the loads change, and checking experimentally the level of matching between foreseen and measured strains.

After the p points of the model are selected, it is determined (120), e.g. by measurement or by simulation, a strain vector $$V_\epsilon = (V_{\epsilon 1}, V_{\epsilon 2}, \ldots, V_{\epsilon p})$$

suitable to establish a biunique correspondence between each value of the vector $V_L$ and each value of the vector $V_\epsilon$.

That allows, for each known strain distribution, e.g. because experimentally measured or theoretically obtained starting from the knowledge of the physical and mechanical properties of the structure and from the test loads acting on it, to mutually associate a value of the vector $V_L$ and a value of the vector $V_\epsilon$. The whole of the biunique correspondences between loads and induced strains populates a first database DB1 (130) that can be stored in a memory module of the prognostic on board system, coupled with the processing unit.

Stated that for a given load vector $V_L = (V_{L1}, V_{L2}, \ldots V_{LK})$, a strain distribution $\epsilon_{ijk}$ is produced in the points network $N_{ijk}$ of the structure, the strain deformation in the network produced by the same load vector $V_L$ when a defect $d_q$ is present in the structure is indicated as $(\epsilon_{ijk})_q$.

A structure defect can be a hole, a filled hole or other surface or bulk modification, e.g. induced by inserting a fastener, by impact damage, delamination, porosity, or due to a zone of the structure with different resin or fibre content. A defect can be concentrated in a point with specific co-ordinates or distributed in a direction, on a surface or in a volume of the structure.

It has to be noticed that, by selecting in a suitable way the p detection points on the structure, a possible concentrated defect, located far from them, could not induce any variation in the strain vector $V_\epsilon = (V_{\epsilon 1}, V_{\epsilon 2}, \ldots, V_{\epsilon p})$, whereby an unmodified strain vector compounds to a given load vector $V_L = (V_{L1}, V_{L2}, \ldots, V_{LK})$ also in presence of a defect $V_{\epsilon d} = V_\epsilon$.

Also preliminarily, through an off-line processing system not integrated onboard the aircraft and once and for all, for predetermined types and size of defects, a modeling of the defects is performed (200) as well as an experimental verification of it, possibly correcting the model for a correct reality representation (validation of the defects model).

In detail, defects can be of different type, size, and position on the plan and in the structure thickness.

For each load vector, $V_L = (V_{L1}, V_{L2}, V_{LK})$ to which a strain vector $V_\epsilon = (V_{\epsilon 1}, V_{\epsilon 2}, V_{\epsilon p})$ compounds in the selected detection points, it is consequently associated (210) a vector of strain variation $\Delta V_\epsilon = V_{\epsilon d} - V_\epsilon = (\Delta V_{\epsilon 1}, \Delta V_{\epsilon 2}, \ldots, \Delta V_{\epsilon p})$ representative for a variation induced by the defect, and this is possible for each classification parameter for the defect (i.e.: type, size, positioning).

Of course, the selection criteria for the detection points preferably must take into account the structure defect sensitivity in such points, otherwise some element $\epsilon V_{\epsilon i}$ of the vectors can be null, up to the limit of the condition $V_{\epsilon d} = V_\epsilon$ for which $\Delta V_\epsilon$ is a null vector.

So it is possible to attribute an associating relation between a discrete number of values of the load vector $V_L$, a discrete number of values of the strain vector $V_\epsilon$ and a corresponding discrete number of values of the strain variation vector $\Delta V_\epsilon$ for each defect.

The whole of biunique correspondences, for each type of defect, among the load vector $V_L$, the strain variation vector $\Delta V_\epsilon$ and the type of defect, populates a second database DB2 (220), that can be stored in a memory module of the prognostic on board system, coupled with the processing unit.

A computer program that can be executed by the processing unit of the prognostic onboard system is adapted to determine a defect identification law and to recognise a defect starting from the correlation between the detected strain variation and the applied loads.

The prognostic method, referred to the structure of a fuselage panel drafted in FIG. 2, is based on the previous considerations and starts from the first and the second database DB1, DB2 stored by the board autonomous system. Specifically, this method is carried out by an on board processing unit arranged for the execution of groups or modules of computer and calculation programs recorded on a disc or accessible on the web, which implement the method according to the invention, as will be described in detail in the following.

The technical solutions to implement the onboard processing system herein described are considered well known in the art and will not be further described here because they are not relevant for the implementation actuation and comprehension of this invention.

As previously reported p primary detection points ($P_1$, $P_2$, ..., $P_p$) are given on the structure, as well as s additional or comparison detection points ($P_{p+1}$, $P_{p+2}$, ..., $P_{p+s}$) in which the sensors are placed to read the strains of the structure subject to operative loads.

At any time, on the basis of the strain detections (300) in the p primary detection points of the structure ($P_1$, $P_2$, ..., $P_p$), the associated load (310) is determined for comparison with the first database DB1. Starting from the presumed load it is estimated (320) a strain mapping in all the structure points identified according to the generated finite element model, which also includes the strains in the s additional detection points ($P_{p+1}$, $P_{p+2}$, ..., $P_{p+s}$).

Preferably, the system is set to take into account the variations of the structure dimensions and of the structure material properties (elastic modulus) induced by the operative temperature of the same structure detected through temperature sensors distributed on it, estimating the contribution to the strain due to thermal expansion or contraction, by means of testing offline an unloaded structure with similar deformation characteristics, putting strain detectors into it.

Thus the system compares (330) the estimated strains in the s additional detection points ($P_{p+1}$, $P_{p+2}$, ..., $P_{p+s}$) with the ones measured in such points, checking if they are coincident, with a fixed tolerance threshold.

Also the measurement of the strains in the s comparison detection points is preferably corrected by subtracting the contribution to the strain due to thermal expansion or contraction, as previously explained.

In case of agreement between forecast and measured strain the soundness of the structure is assessed (340). In case of disagreement, it is checked the hypothesis that there are structure variations close to some of the p points, such that they are able to affect the strain induced in such points by virtue of the applied load.

In this case, the presence of defects in correspondence with the points in which a difference is detected between theoretic and measured strain values is assessed, obtaining first the result of detecting, and at the same time positioning a defect of the structure (350).

Finally, the strain differences (measured strains vs. forecast strains) are associated with the supposed defect by comparison with the content of the second database DB2, obtaining the possibility to recognise (360) the class (type and size) of the defect (qualitative and quantitative defect description).

Of course, as it will be clear for a skilled person in the art, the method terminated as shown in the flow diagram in the figure can be cyclically repeated, e.g. at periodic intervals predetermined according to a pre-defined checking plan, starting from new simultaneous strain detections in the detection points of the structure.

Advantageously, in order to allow the system working also in case of structure damaging close to some of the detection points and consequently in case of damaging of the sensors, a redundancy is created by increasing the number of detection points, in order to get an additional number of additional back up sensors.

Figure 4A:
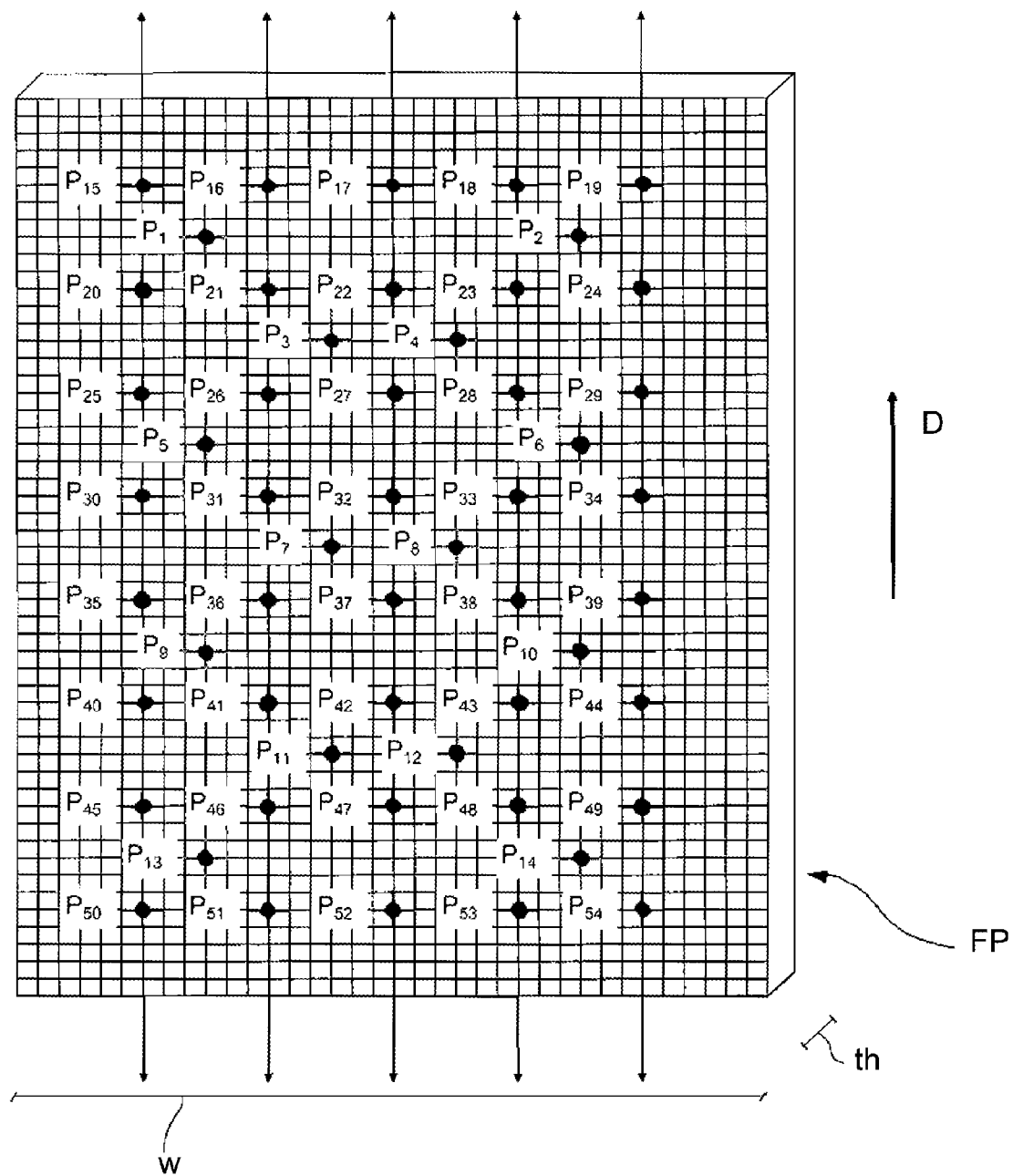
FIGS. 4a and 4b show a fuselage panel of an aircraft, in which the relevant points of placement of the strain sensors are pointed out, specifically 14 primary detection points and 40 comparison detection points, respectively in a condition of sound structure and structure with a defect.
Figure 4B:
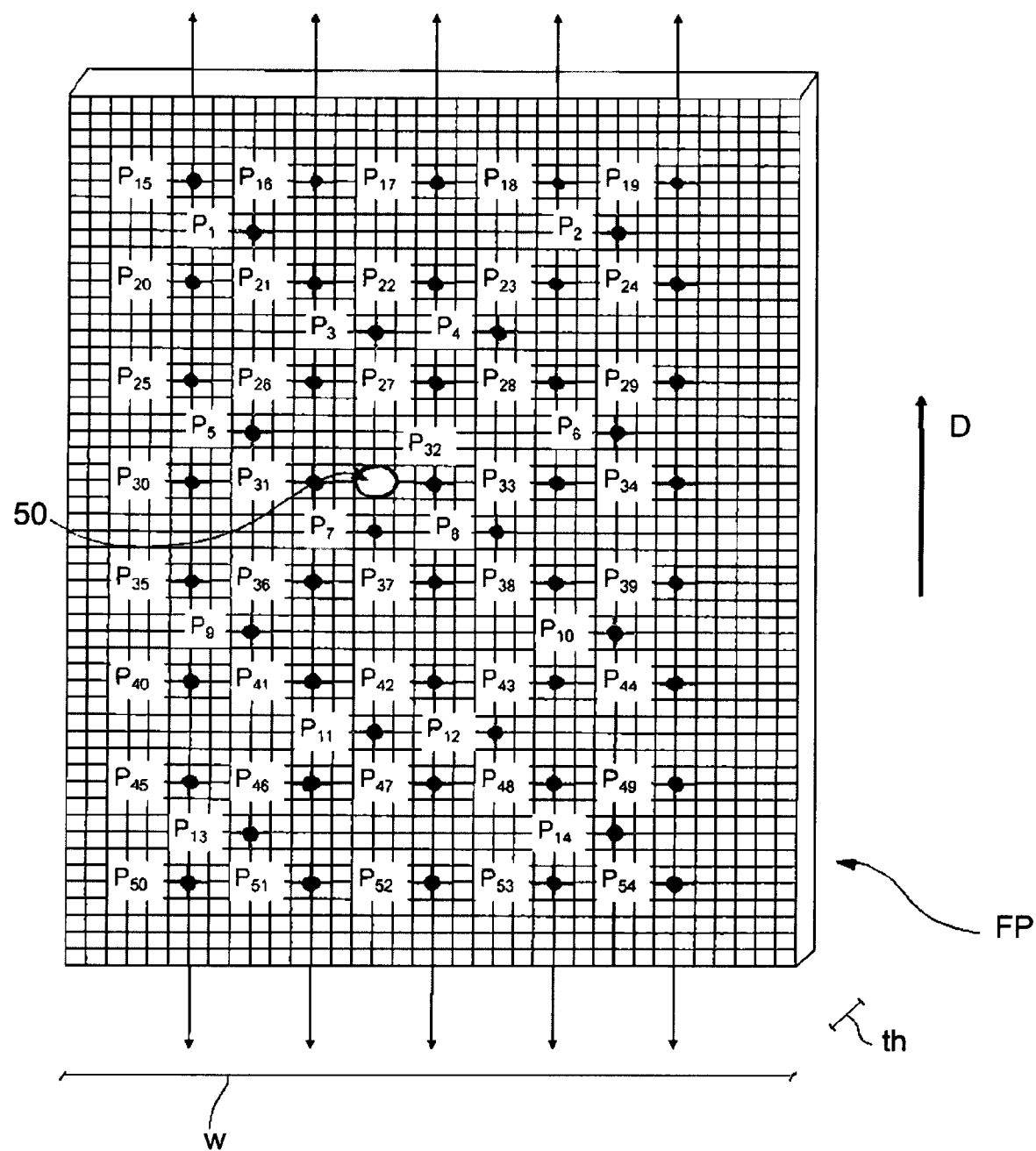

A qualitative example of operation of the method according to the invention is given in the following, referred to a fuselage panel structure FP shown in FIGS. 4a and 4b. To simplify the description a flat panel is considered as an example, having a width of W=1800 mm, a thickness of th=5 mm and a longitudinal elastic modulus (in the direction indicated by the arrow D) of E1=1000 MPa.

On it 14 primary detection points ($P_1$, $P_2$, ..., $P_{14}$) are located, as well as other 40 comparison detection points ($P_{15}$, $P_{16}$, ..., $P_{54}$) in which the sensors to read the strain are placed, oriented in the direction D. In order to simplify the representation the temperature sensors are not shown; they are anyway present, in order to allow a correct evaluation of the panel strains due to the mechanical load, independent from the thermal loads.

In the specific case the hypothesis will be that the detected strains (vector V$\epsilon$) are the ones shown in table 1.

TABLE 1

| Detection points | STRAIN |
| --- | --- |
| $P_1$ | 0.01 |
| $P_2$ | 0.01 |
| $P_3$ | 0.01 |
| $P_4$ | 0.01 |
| $P_5$ | 0.01 |
| $P_6$ | 0.01 |
| $P_7$ | 0.01 |
| $P_8$ | 0.01 |
| $P_9$ | 0.01 |
| $P_{10}$ | 0.01 |
| $P_{11}$ | 0.01 |
| $P_{12}$ | 0.01 |
| $P_{13}$ | 0.01 |
| $P_{14}$ | 0.01 |

The system subject of the invention identifies, through the first database DB1, a unidirectional tension load (vector $V_L$) uniformly distributed on the surface, with a resultant of 90000 N.

Always through the first database DB1, it identifies the forecast strains in the 40 points ($P_{15}$, $P_{16}$, ..., $P_{54}$), which are reported in the following table 2.

TABLE 2

| Points for prognostic sensors | Strain |
| --- | --- |
| $P_{15}$ | 0.01 |
| $P_{16}$ | 0.01 |
| $P_{17}$ | 0.01 |

TABLE 2-continued

| Points for prognostic sensors | |
|---|---|
| | Strain |
| $P_{18}$ | 0.01 |
| $P_{19}$ | 0.01 |
| $P_{20}$ | 0.01 |
| $P_{21}$ | 0.01 |
| $P_{22}$ | 0.01 |
| $P_{23}$ | 0.01 |
| $P_{24}$ | 0.01 |
| $P_{25}$ | 0.01 |
| $P_{26}$ | 0.01 |
| $P_{27}$ | 0.01 |
| $P_{28}$ | 0.01 |
| $P_{29}$ | 0.01 |
| $P_{30}$ | 0.01 |
| $P_{31}$ | 0.01 |
| $P_{32}$ | 0.01 |
| $P_{33}$ | 0.01 |
| $P_{34}$ | 0.01 |
| $P_{35}$ | 0.01 |
| $P_{36}$ | 0.01 |
| $P_{37}$ | 0.01 |
| $P_{38}$ | 0.01 |
| $P_{39}$ | 0.01 |
| $P_{40}$ | 0.01 |
| $P_{41}$ | 0.01 |
| $P_{42}$ | 0.01 |
| $P_{43}$ | 0.01 |
| $P_{44}$ | 0.01 |
| $P_{45}$ | 0.01 |
| $P_{46}$ | 0.01 |
| $P_{47}$ | 0.01 |
| $P_{48}$ | 0.01 |
| $P_{49}$ | 0.01 |
| $P_{50}$ | 0.01 |
| $P_{51}$ | 0.01 |
| $P_{52}$ | 0.01 |
| $P_{53}$ | 0.01 |
| $P_{54}$ | 0.01 |

The processing unit U of the system compares the strains ($V_\epsilon$) which are forecast in the 40 points $P_{15}$-$P_{54}$ with the ones measured ($V_{\epsilon d}$) in the same points. If a correct model is assumed, in absence of defects the system will observe the coincidence between the forecast and measured strain values.

In this case the soundness of the structure is assessed.

In case of overall disagreement, the hypothesis that some variations $\Delta V_\epsilon$ have been induced in some of the 14 points where the primary detection sensors have been placed is checked. If it is assumed that the number of 14 sensors is redundant, the system executes a check cycle leaving out in turn one (or more) of them and re-calculating the estimated strains in the points $P_{15}$-$P_{54}$ up to the overcoming of the status of total disagreement.

In case of partial disagreement, it is assessed the presence of defects in the proximity of the points in which a difference is detected between the theoretic ($V_\epsilon$) and measured ($V_{\epsilon d}$) strain values under load. An example of measured strain values is reported in table 3.

TABLE 3

| Points for prognostic sensors | |
|---|---|
| | Strain |
| $P_{15}$ | 0.01 |
| $P_{16}$ | 0.01 |
| $P_{17}$ | 0.01 |
| $P_{18}$ | 0.01 |
| $P_{19}$ | 0.01 |
| $P_{20}$ | 0.01 |
| $P_{21}$ | 0.01 |
| $P_{22}$ | 0.01 |
| $P_{23}$ | 0.01 |
| $P_{24}$ | 0.01 |
| $P_{25}$ | 0.01 |
| $P_{26}$ | 0.01 |
| $P_{27}$ | 0.01 |
| $P_{28}$ | 0.01 |
| $P_{29}$ | 0.01 |
| $P_{30}$ | 0.015 |
| $P_{31}$ | 0.022 |
| $P_{32}$ | 0.022 |
| $P_{33}$ | 0.015 |
| $P_{34}$ | 0.011 |
| $P_{35}$ | 0.01 |
| $P_{36}$ | 0.01 |
| $P_{37}$ | 0.01 |
| $P_{38}$ | 0.01 |
| $P_{39}$ | 0.01 |
| $P_{40}$ | 0.01 |
| $P_{41}$ | 0.01 |
| $P_{42}$ | 0.01 |
| $P_{43}$ | 0.01 |
| $P_{44}$ | 0.01 |
| $P_{45}$ | 0.01 |
| $P_{46}$ | 0.01 |
| $P_{47}$ | 0.01 |
| $P_{48}$ | 0.01 |
| $P_{49}$ | 0.01 |
| $P_{50}$ | 0.01 |
| $P_{51}$ | 0.01 |
| $P_{52}$ | 0.01 |
| $P_{53}$ | 0.01 |
| $P_{54}$ | 0.01 |

In this case it is assessed the presence of defectiveness, localized in the panel region comprised between the points $P_{30}$, $P_{31}$, $P_{32}$, $P_{33}$, $P_{34}$.

Afterwards, the strain differences (detected strains vs forecast strains) are associated with a defect (type and size) which is the probable cause thereof through the second database DB2. In the specific case, the system identifies that the defect is given by the presence of a hole, indicated with 50, with the size shown in FIG. 4b.

Of course, keeping the principle of the invention, the embodiments and implementing details can be largely modified in comparison with what has been described and illustrated by way of example not limiting example, without departing from the scope of the invention as defined by the attached claims.

The invention claimed is:

1. A method for prognostics of a structure subject to loads, particularly an aircraft structure, comprising performing on a processor the steps of:
   providing a first database linking possible loads acting on the structure in operating conditions with a modified state of the structure, including values of a quantity indicative of the state of the structure as modified in the presence of said loads in a predetermined number of relevant points;
   providing a second database linking changes of the state of the structure induced by pre-established defects in a predetermined number of relevant points of the structure, with possible classes of defects; and,
   iteratively:
   detecting the values of said quantity indicative of the state of the structure in a first plurality of primary detection points and in a second plurality of additional detection points;

determining from the first database the loads acting on the structure starting from the detected values of the state quantity;

estimating, based on the determined loads, the values of the state quantity in the additional detection points; wherein comparing between the estimated values and detected values of the state quantity in the additional detection points;

wherein a condition of integrity of the structure is determined if the difference between the detected values and the estimated values of the state quantity in the additional detection points are within a predetermined tolerance, and a condition of defectiveness of the structure is determined if the differences between the detected values and the estimated values of the state quantity are outside a predetermined tolerance.

2. A method according to claim 1, wherein said quantity indicative of the state of the structure is the local strain of the structure.

3. A method according to claim 2, wherein a population of the first database comprises a bi-unique association between values of typical loads acting on the structure in operating conditions and measured or simulated strain values of the structure subject to said loads.

4. A method according to claim 2, wherein a population of the second database comprises a bi-unique association between measured values of the changes of strain in the structure induced by a same load vector in the presence of a defect in the structure and data of identification of a possible defect of the structure.

5. A method according to claim 1, comprising identifying a defect of the structure by associating the changes between the detected values and the estimated values of the state quantity with a type of defect in the second database.

6. A method according to claim 5, wherein the type of defects includes at least one of data of: the defect class; the defect dimension; the position of the defect in the structure.

7. A method according to claim 1, wherein said relevant points of the structure are selected from a plurality of points of identification of the structure which are defined based on a predetermined mathematical model of said structure.

8. A method according to claim 7, wherein said relevant points on the structure are selected among the points that, according to said model, are capable of identifying a state condition of the structure which can be associated univocally with a load condition, with concentration in proximity of regions of greater structural criticality.

9. A method according to claim 1, including estimating the contribution to the change of the state of the structure in said detection points due to changes in the properties of the structure material induced by the operating temperature.

10. A non-transitory computer readable medium encoded with a computer program or set of programs to be run on a processor, comprising one or more code modules for carrying out a method for prognostics of a structure subject to loads according to claim 1.

11. A system for prognostics of a structure subject to loads, particularly an aircraft structure, comprising:
    a first and a second plurality of detection sensors, located in primary detection points and additional comparison detection points, respectively;
    first storage comprising a first database linking possible loads acting on the structure in operating conditions with a modified state of the structure, including values of a quantity indicative of the state of the structure as modified in the presence of said loads in a predetermined number of relevant points;
    second storage comprising a second database linking changes of the state of the structure induced by pre-established defects in a predetermined number of relevant points of the structure, with possible classes of defects; and
    a processor configured for iteratively:
    detecting the values of said quantity indicative of the state of the structure in a first plurality of primary detection points and in a second plurality of additional detection points;
    determining from the first database the loads acting on the structure starting from the detected values of the state quantity;
    estimating, based on the determined loads, the values of the state quantity in the additional detection points; wherein
    comparing between the estimated values and detected values of the state quantity in the additional detection points;
    determining a condition of integrity of the structure if the difference between the detected values and the estimated values of the state quantity in the additional detection points are within a predetermined tolerance, and
    determining a condition of defectiveness of the structure if the differences between the detected values and the estimated values of the state quantity are outside a predetermined tolerance.

12. A system according to claim 11, wherein said detection sensors include sensors of the strain in the structure.

13. A system according to claim 11, comprising temperature sensors positioned in proximity of said detection points.

14. A system according to claim 11, wherein said processor is arranged for identifying a class of defect of the structure, concentrated or distributed, selected from the group of surface or bulk modifications comprising a hole, a filled hole, the insertion of a connection member, a damage due to a crash, delamination, porosity, a region of the structure differently rich in resins or fibres.

* * * * *